United States Patent [19]

Bowman et al.

[11] Patent Number: 4,605,999
[45] Date of Patent: Aug. 12, 1986

[54] SELF-OSCILLATING HIGH FREQUENCY POWER CONVERTER

[75] Inventors: Wayne C. Bowman, Rockaway; Randhir S. Malik, Succasunna; Harold Seidel, Warren; Weyman B. Suiter, Jr., Whippany; Norman G. Ziesse, Chester, all of N.J.

[73] Assignee: AT&T Bell Laboratories, Murray Hill, N.J.

[21] Appl. No.: 710,506

[22] Filed: Mar. 11, 1985

[51] Int. Cl.$^4$ .............................................. H02M 3/338
[52] U.S. Cl. ........................................ 363/19; 363/40; 363/75; 363/97; 363/131; 323/248
[58] Field of Search .................. 363/16, 18, 19, 97, 363/131, 40, 75, 17; 323/248

[56] References Cited

U.S. PATENT DOCUMENTS 3,875,493  4/1975  Kunzinger et al. ............... 363/75 X
4,449,174  5/1984  Ziesse ................................... 363/21

OTHER PUBLICATIONS

Richard Myers and Robert D. Peck, "200-KHz Power FET Technology in New Modular Power Supplies", *Hewlett Packard Journal*, pp. 3-7, 8/1981.

*Primary Examiner*—Patrick R. Salce
*Assistant Examiner*—Emanuel Todd Voeltz
*Attorney, Agent, or Firm*—Alfred G. Steinmetz

[57] ABSTRACT

A self-oscillating power converter utilizes a MOSFET power transistor switch with its output electrode coupled to a tuned network that operatively limits the voltage waveform across the power switch to periodic unipolar pulses. The transistor switch may be operated at a high radio frequency so that its drain to gate interelectrode capacitance is sufficient to comprise the sole oscillatory sustaining feedback path of the converter. A reactive network which is inductive at the operating frequency couples the gate to source electrodes of the transistor switch and includes a variable capacitance as a means of adjusting the overall reactance, and hence the converter's switching frequency in order to provide voltage regulation. A resonant rectifier includes a tuned circuit to shape the voltage waveform across the rectifying diodes as a time inverse of the power switch waveform.

23 Claims, 9 Drawing Figures

SELF-OSCILLATING HIGH FREQUENCY POWER CONVERTER

FIELD OF THE INVENTION

This invention relates to self-oscillating DC-to-DC power converters operating in the high radio frequency range; and more particularly, to the oscillating inverter, resonant rectifier circuitry and associated regulation circuitry.

BACKGROUND OF THE INVENTION

A typical switching-type power converter circuit operates by storing and releasing energy in various discrete capacitive and inductive components during each cycle of operation, where the time interval for each cycle is determined by the switching frequency. An increase in switching frequency reduces the storage time interval and the level of energy stored in reactive components during any one particular cycle of operation. In principle this increase in frequency permits reduction of both the physical and electrical sizes of magnetic and capacitive storage elements for any particular power capacity.

Inasmuch as a significant increase in operating frequency of a converter promises a significant size reduction in the circuit components on the basis of energy storage per unit volume, the fact that the switching frequency of power converters has not increased dramatically is indicative of other constraints on the increase of operating frequencies. For example, the switching speed of bipolar semiconductor switching devices is limited by charge storage, thereby limiting the benefits to be achieved from high frequency operation. MOSFET switching devices may be used in place of bipolar devices; however, their switching speeds are limited by device capacitances and parasitic lead wire inductances.

Circuit components generally include parasitic electrical parameters that produce undesirable effects at high frequencies, and considerable design effort must be expended to compensate for them. For example, at high frequencies, the parasitic inductance and resistance of a capacitor decrease its efficiency. For inductors interwinding capacitance, winding resistance, and core loss also limit the maximum practical switching frequency. Circuit board layouts also contribute numerous stray capacitances, inductances, and resistances which detract from power supply performance at high frequency. Because of these complicating factors, it is extremely difficult to produce a traditional switching power supply circuit that operates at frequencies much above 500 Khz.

Despite the theoretical advantages of high frequency operation of power conversion circuits, these circuits have not been practical because of the many component and design problems related to operational difficulties at very high frequencies. One high frequency power supply which surmounts these difficulties is disclosed in U.S. Pat. No. 4,449,174 issued to N. G. Ziesse on May 15, 1984 and which is assigned to the same assignee as this application. That patent discloses a High Frequency Resonant Power Converter that can operate at high radio frequencies.

That circuit was designed to benefit from the advantages of high frequency operation by using the parasitic or adjunct reactive electrical characteristics of components as positive circuit elements. The term adjunct component is used herein to mean an electrical component characteristic inherent in a device, component, or length of conductor that is often considered a deleterious parasitic component but which is fully and positively utilized in the illustrative circuit herein embodying the principles of the invention. The switching device of the power train described in the Ziesse patent referenced above is driven by a separate or independent high frequency signal source. Voltage regulation is achieved by providing a range of frequency adjustment which is adjusted either directly or by feedback means to attain a desired output voltage level. Hence, the signal source driving the power switching device must be capable of operating over a sufficiently wide band of frequencies to provide the converter with a regulated output voltage over a range of output current and input voltage that depends upon the converter's usage.

The added circuitry of a separate high frequency driver stage to drive the power switching device and provide frequency adjustment for regulation adds complexity to the converter in terms of the component count. If the drive circuit has a wide bandwidth to accommodate the frequency adjustment range, it cannot be precisely matched into the gate, and much of the drive energy is wasted. To achieve the desired high efficiency, a drive circuit must have a narrow instantaneous bandwidth and be tunable over the frequency adjustment range. A separate, tunable drive circuit, however, adds still further to circuit complexity or component count.

SUMMARY OF THE INVENTION

The self-oscillating power train disclosed herein offers a solution to this problem in that the power switch is driven via a circuit having relatively few components and regeneratively deriving the drive power directly from the power train itself. Furthermore, its narrow tunable bandwidth permits operation at high overall efficiencies.

A self-oscillating power converter embodying the principles of the invention utilizes a MOSFET power switch (insulated gate field effect transistor) with its output electrode coupled to a tuned network that operatively limits the voltage waveform across the power switch to a fraction of a cycle of operation. The MOSFET power switch may be operated at a high enough radio frequency so that its internal (i.e., parasitic or adjunct) drain to gate capacitance is sufficient to comprise the sole oscillatory sustaining feedback path of the converter. At lower frequencies, it may be necessary to add supplementary external capacitance, however the principle of operation remains the same.

A reactive network that is inductive at the operating frequency of the converter couples the gate to source electrodes of the MOSFET switch and includes a variable capacitance as a means of adjusting the overall inductive reactance. The variable capacitance may comprise a varactor diode arrangement. Another suitable arrangement, or a directly variable inductance may be used in place of using variable capacitance control. The converter's switching frequency is substantially controlled at a value slightly less than the resonant frequency of the inductive network in shunt connection with the gate to source interelectrode capacitance to obtain the correct phase of the feedback signal. The overall effect of the tuned circuitry connected to the MOSFET gate is to respond predominantly to the fundamental component of the drain to source voltage and produce a continuous and substantially sinusoidal waveform drive signal at the gate electrode having the proper amplitude and phase to sustain the self-oscillation.

The self-oscillating drive arrangement for the power switch has an inherent narrow bandwidth that is tuneable over a wide frequency range. Hence, the frequency of operation of the power converter may be varied for regulation purposes without losing the efficiency advantages of a narrow bandwidth drive. This self-oscillating arrangement is also simpler in construction and has fewer component parts than an equivalent independent drive circuit for the power switch bandwidth.

A feature of the converter is the use of resonant rectifier that positively utilizes leakage inductance of the converter power transformer and its parasitic lead inductances as well as the adjunct capacitances of the rectifier diodes as part of a tuned LC circuit. This tuned circuit shapes the voltage waveform across the diodes to appear substantially as a time reversal of the voltage waveform across the inverter switching device.

It is readily apparent that this converter circuit advantageously utilizes the adjunct reactances of the components in a positive manner as part of the operative converter and that by use of self-oscillation significantly improves the overall efficiency and reduces the overall parts count of the converter. This use of adjunct components permits a practical converter operating at high radio frequencies to be realized using fewer discrete components.

BRIEF DESCRIPTION OF THE DRAWINGS

An understanding of the invention may be obtained by reference to the following specification and the drawings in which.

DETAILED DESCRIPTION

Figure 1:
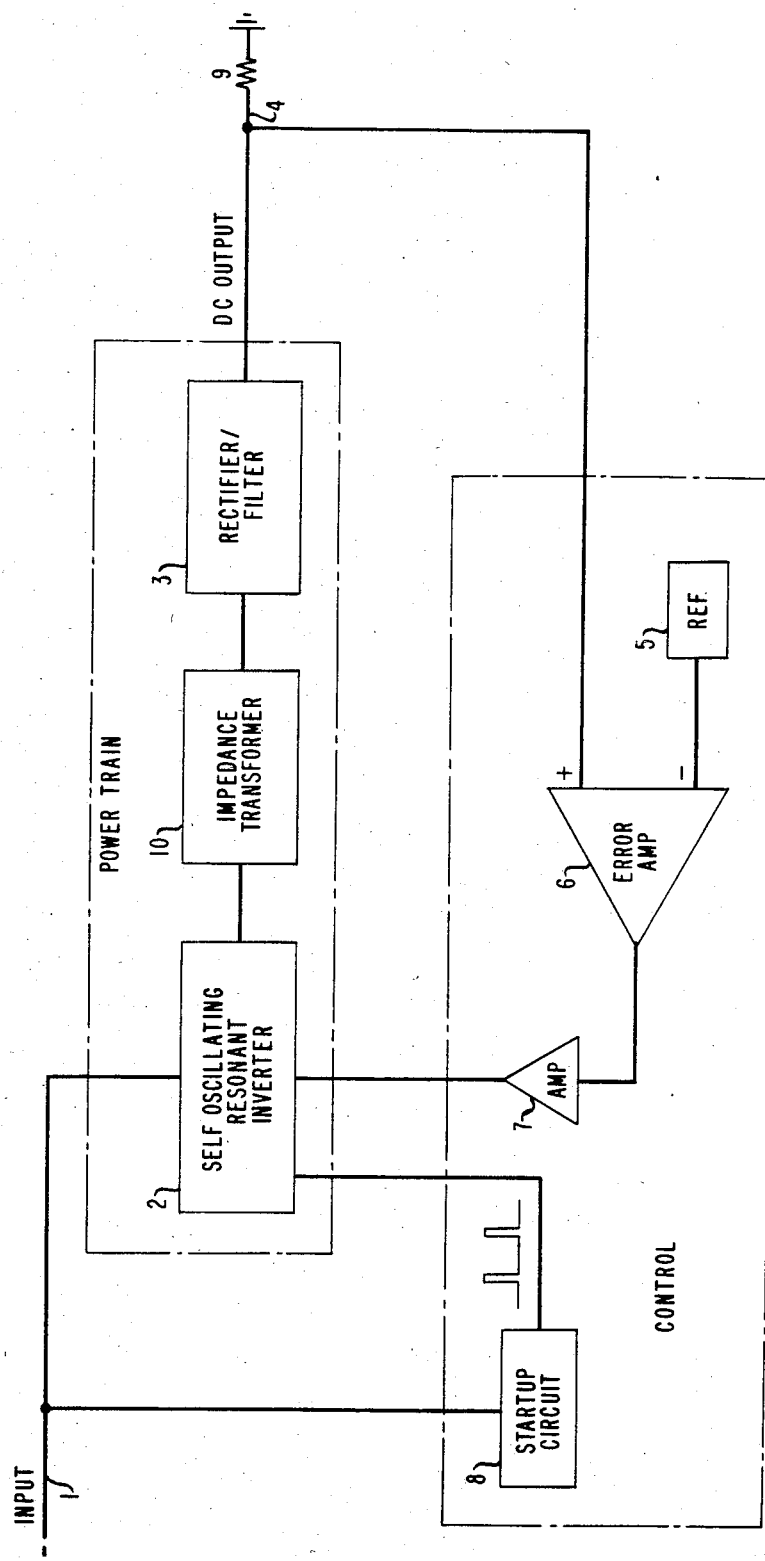
FIG. 1 is a functional block diagram of a high frequency DC-to-DC power converter embodying the principles of the invention.

A high frequency DC-to-DC power converter embodying the principles of the invention is shown functionally in FIG. 1 and comprises a power train circuit including a self-oscillating resonant inverter 2, an impedance transformer 10 and a resonant rectifier/filter network 3. A control circuit including an error amplifier 6 is utilized to supply an error signal for controlling the frequency of inverter 2, and hence, achieve a regulated voltage at output 4. A DC voltage is applied to input terminal 1 and is coupled to a switching device in the inverter 2 and to a start-up circuit 8. The self-oscillating inverter 2 does not self-start, hence the start-up circuit 8 is included to respond to a DC voltage at input 1 and apply a trigger signal to initiate oscillations in the self-oscillating inverter 2. The output of the inverter 2 is coupled to an impedance transformer 10 which, in turn, is connected to a rectifier filter circuit 3. The rectified output, a DC voltage, is coupled, via lead 4, to a load indicated herein for illustrative purposes as resistive load 9.

The self-oscillating inverter circuit 2 and the impedance transformer 10 include a series L-C circuit into which the transistor power switch operates. The overall power train network comprises a tuned network which controls the current and voltage waveform across the power switch of the inverter circuit so that there is minimal overlap during switching transition intervals and thereby reduced power dissipation during these switching transitions. A complete discussion of a power converter having a similar inverter arrangement and which is driven rather than self-oscillating is disclosed in the aforementioned U.S. Pat. No. 4,449,174 issued to N. G. Ziesse on May 15, 1984 and assigned to the same assignee. This patent discusses the details of the various power train components and their operation and it is not believed necessary to disclose these matters in detail herein.

Figure 2:
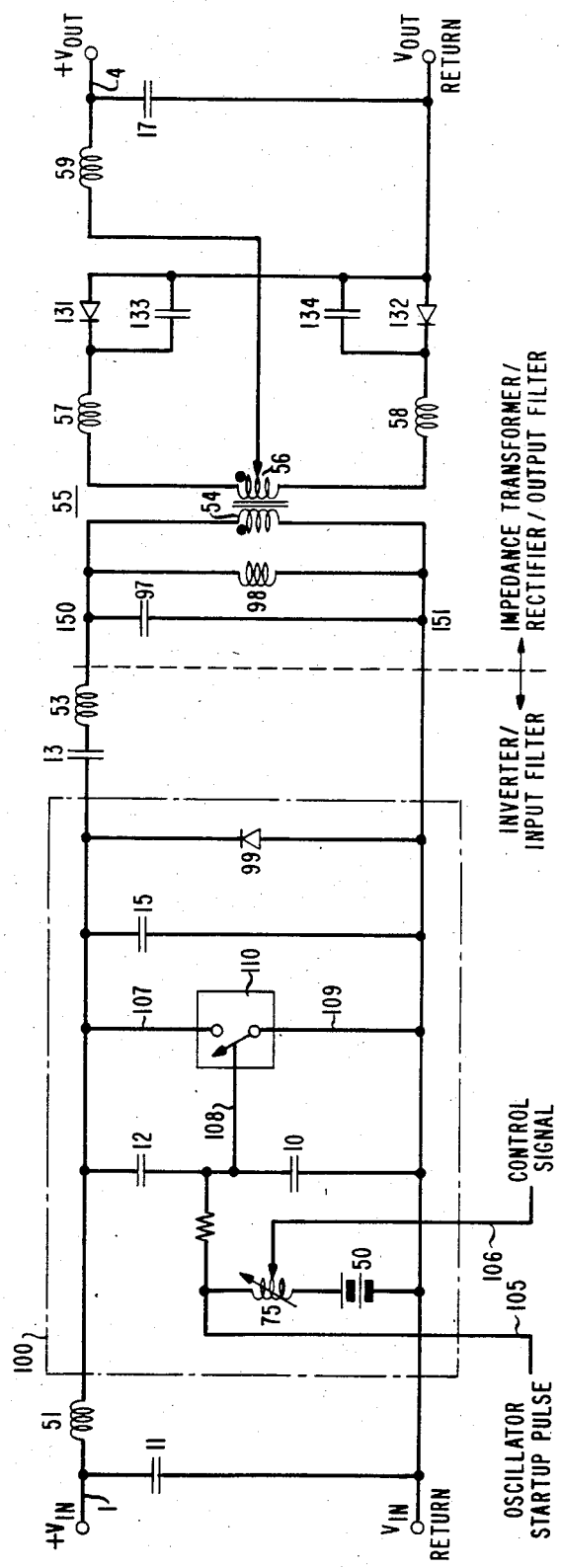
FIG. 2 is a simplified schematic of a self-oscillating power train of the high frequency DC-to-DC power converter.

The power train of the power converter including the self-oscillating inverter is shown in more detail in FIG. 2. DC voltage is applied to input terminal 1 which is coupled to a filter circuit including an RF choke inductor 51 and capacitor 11. The RF choke 51 is coupled to a terminal 107 of a semiconductor power switch 110 shown symbolically as a switch.

Figure 4:
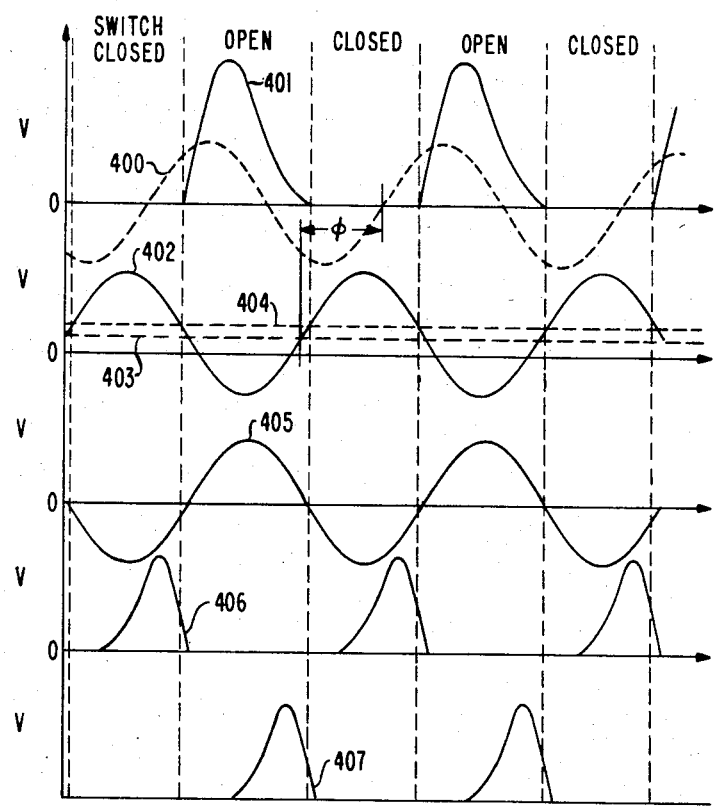
FIG. 4 discloses signal waveforms to assist in describing the operation of the power converter shown in FIGS. 2 and 3.

The output of the power switch 110 at electrode 107 is coupled into a series tuned LC circuit including capacitor 13 and inductor 53 which in conjunction with the rest of the output network and capacitor 15 constrains the current and voltage waveforms across the power switch 110 to assume certain desired characteristics. These waveforms may be seen in FIG. 4 where waveform 401 represents the voltage waveform across the main power path of the power switch 110. The fundamental sinusoidal component of voltage waveform 401 is shown by waveform 400. The voltage waveform 402 represents the drive signal applied between control terminal 108 and terminal 109 of the power switch 110. This voltage waveform 402 approximates a sinusoidal waveform that contains a DC component 403 supplied as shown by the battery 50 or other DC voltage source. The switch 110 becomes conducting when the waveform 402 exceeds the threshold level 404 of switch 110. It is apparent from these waveforms that current conduction through the power switch 110 (i.e., while waveform 402 is above the threshold level 404) occurs only when there is no voltage drop across the switch 110 (i.e., waveform 401 is substantially zero). The simultaneous existence of substantial current through and voltage across the switch 110 is thus minimized, giving rise to little or no switching loss. The waveform of the current flowing through the series tuned circuit of capacitor 13 and inductor 53 has a quasi sinusoidal shape. The series tuned network of capacitor 13 and inductor 53 is coupled to a shunt tuned network including capacitor 97 and inductor 98 and in turn to the primary winding 54 of an ideal isolating and impedance matching transformer 55. The secondary winding 56 is connected to a resonant fullwave rectifier including the rectifying diodes 131 and 132. This resonant rectifier builds upon the halfwave resonant rectifier disclosed in the aforementioned Ziesse patent and operates on the same principle. Capacitors 133 and 134 are shown shunting each diode. These may be discrete or adjunct capacitances depending upon the diode devices used and the frequency of operation. The inductors 57 and 58, together with capacitors 133 and 134, shape the voltage across the diodes as shown in FIG. 4. The voltage waveform across rectifying diode 131 is shown by waveform 406 in FIG. 4 and the waveform 407 represents the voltage waveform across diode 132. These voltage waveforms, as are apparent from FIG. 4, are substantially a time reverse waveform of the voltage waveform 401 appearing across the MOSFET power switch. The rectified output signal is applied to a filter comprising inductor 59 and capacitor 17 supplying a filtered DC voltage to output terminals 4.

A practical major advantage of the resonant rectifier circuit for high radio frequency operation is that it can utilize to advantage unavoidable parasitic lead inductance and transformer leakage inductance as part or all of the inductors 57 and 58. Furthermore, inductors 57 and 58 in conjunction with the shunt tuned circuit of capacitor 97 and inductor 98 act to make the input impedance of the rectifier as seen between nodes 150 and 151 linear in nature thus maintaining a substantially sinusoidal voltage 405 and current at this point.

A variable inductor 75 is shown with a battery 50 as coupling the power switch control electrode 108 to electrode 109 which is in parallel with capacitance 10. The feedback signal across capacitance 10 and the inductor 75 is a continuous quasi sinusoidal signal shown as waveform 402 in FIG. 4. This signal is phase displaced from the fundamental component 400 of the voltage waveform 401 appearing across power switch 110. This feedback signal shown by waveform 402 is offset by bias voltage supply 50 and applied to the power switch control electrode 108 to drive the power switch 110.

A diode 99 shunting the power switch 110 conducts reverse currents which are present under some conditions of input voltage and output power when the power switch 110 is in its nonconducting or off state. This allows the converter to operate over a wider range of input voltage and output power than if diode 99 were not present.

The switching frequency of the power switch 110 is controlled in part by the value of inductance of the variable inductor 75. The phase displacement shown by $\phi$ in FIG. 4 of the driving waveform 402, normally leads waveform 400 by 120° to nearly 180°. The resonant action of inductor 75 in parallel with capacitance 10 responds through feedback capacitor 12 to the voltage waveform at the main power path electrode 107, which is a periodic unipolar pulse-like waveform 401, to produce the substantially sinusoidal drive signal at the control electrode 108 of power switch 110 as shown by waveform 402 in FIG. 4. The inductor 75 is controlled or varied as shown by a signal applied to the control lead 106. This signal applied to lead 106 may be an error signal derived by voltage or current regulation circuitry in response to a deviation of a voltage or current at output lead 4 from a regulated value.

The series L-C circuit comprising capacitor 13 and inductor 53 acting in concert with the shunt tuned circuit comprising capacitor 97 and inductance 98 converts the periodic unipolar signal at the drain electrode 107 into a substantially sinusoidal signal at node 150, which is shown by waveform 405 in FIG. 4. This voltage wave is transmitted through ideal transformer 55 and rectified by the action of the rectifying diode 131 and 132 each of which produces a voltage signal having a waveform, which as shown by waveforms 406 and 407 with a shape characteristic similar to a time reverse of the voltage waveform at electrode 107 of switch 110. These rectified signals are filtered by a filter circuit including inductor 59 and capacitor 17 and a DC voltage appears at output terminal 4 and across the capacitor 17.

The self-oscillating action of the inverter 100 does not begin automatically when power is applied to the invention, and hence a start-up pulse must be supplied at terminal 105 to initiate the oscillating action of the power inverter 100.

Figure 3:
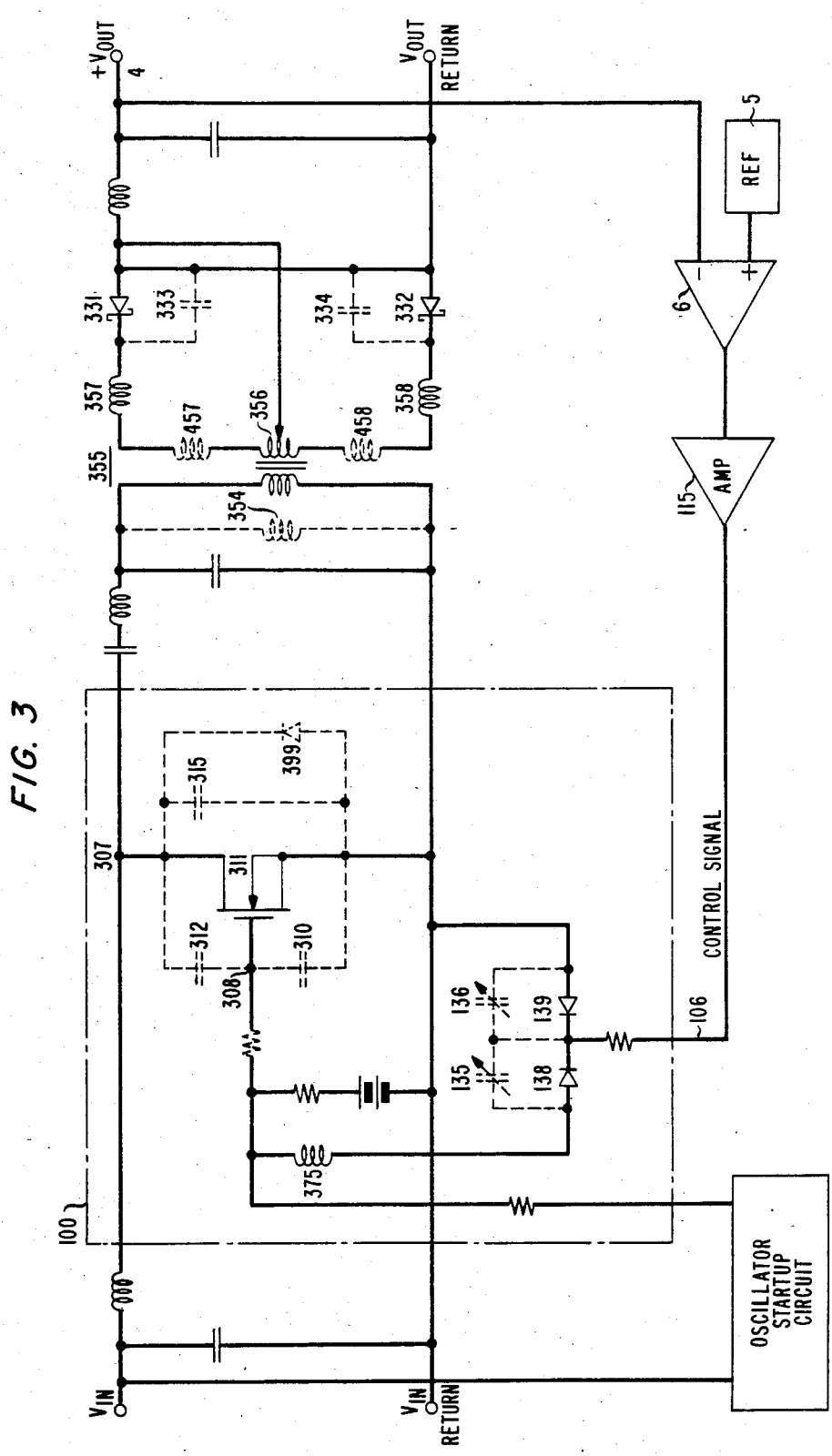
FIG. 3 is a circuit schematic of the power converter including a functional block diagram of a control circuit for voltage regulation and showing the use of adjunct parasitic elements to reduce the number of circuit components at high frequencies.

An embodiment of a self-oscillating power train and associated control and signal processing circuitry to comprise a DC-to-DC converter is disclosed in FIG. 3. This embodiment is suitable for high radio frequency operation. It utilizes the adjunct capacitances of a MOSFET power switch 311 and Shottky rectifier diodes 331 and 332 as converter circuit elements. An inherent body diode 399 of the power MOSFET switch 311 operates to conduct reverse currents through the MOSFET switching device 311 when it is in the off state (that is the channel is not conducting). Furthermore, the magnetizing inductance 354 (shown in dotted line) of the transformer 355 serves to replace shunt inductor 98 (shown in FIG. 2), and the leakage and lead inductances 457 and 458 become dominant portions of the inductors 57 and 58, shown in FIG. 2. Hence, inductors 357 and 358 may be smaller than inductors 57 and 58. This use of adjunct elements provides a unique advantage in that a practical realization of this converter requires few discrete components.

The input and output is coupled by a MOSFET power switch 311 including inherent or adjunct interelectrode capacitances 310, 312 and 315. The drain to gate inherent or adjunct capacitance, shown as capacitor 312, supplies a feedback path from drain electrode 307 to gate electrode 308 sufficient to sustain self-oscillation in the inverter circuit enclosed by dotted line 100 as described below, if the frequency of operation is sufficiently high. While a MOSFET power switch is shown herein, it is to be understood that other semiconductor power switches may be substituted for the MOSFET and the necessary adjunct elements supplied by discrete devices when needed.

The power converter of FIG. 3 is voltage regulated in response to an error signal supplied by a feedback network at control terminal 106. This error signal is supplied by the output of error signal amplifier 6 which compares the converter's output voltage with a reference voltage level supplied by reference voltage source 5. This error voltage is coupled through amplifier 115 to a junction of two diodes 138 and 139 which are connected in series with the inductor 375 which is, in turn, connected to the gate 308 of power switch 311. The diodes 138 and 139 each have significant nonlinear capacitance as shown by capacitors 135 and 136. The error voltage signal applied to the junction of the two diodes 138 and 139 varies their joint voltage responsive capacitance, and hence, alters the overall inductive reactance of the series connection of inductor 375 and the diodes 138 and 139. The overall series circuit is designed to always have an inductive reactance, and in conjunction with the drain to gate capacitance 310 provides the desired phase shifted feedback signal to the gate electrode 108 for oscillations. By altering the capacitive reactance of the two diodes 138 and 139 with the error signal applied to lead 106 the overall inductive reactance of the feedback network may be controlled to permit variations in the frequency of oscillation of the inverter 100. The variations in frequency in combination with the tuned output network varies the DC output voltage level at lead 4, and hence, through the feedback control circuit achieves voltage regulation.

Figure 5:
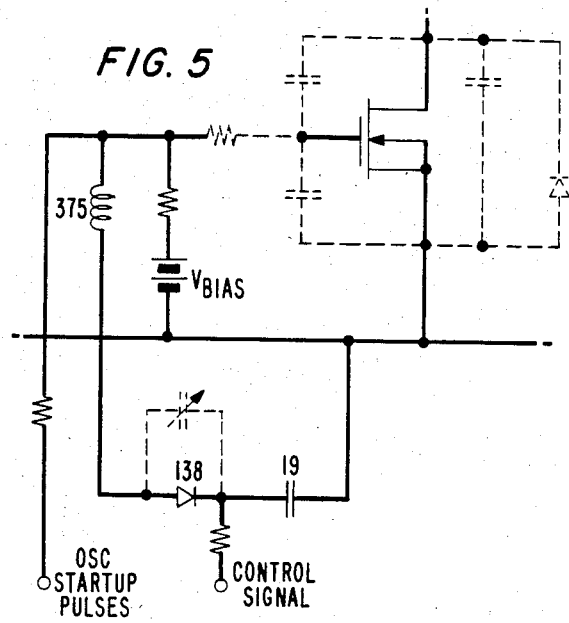
FIGS. 5, 6 and 7 are schematics of alternate self-oscillating power inverter arrangements embodying the principles of the invention.

Another inverter circuit embodiment suitable for application in the power train of the converter is shown in FIG. 5. In this embodiment, the control is applied to a junction of diode 138 and a fixed capacitance 19. The variation of capacitance of diode 138 is sufficient in combination with inductor 375 to achieve the desired reactance range.

Figure 6:
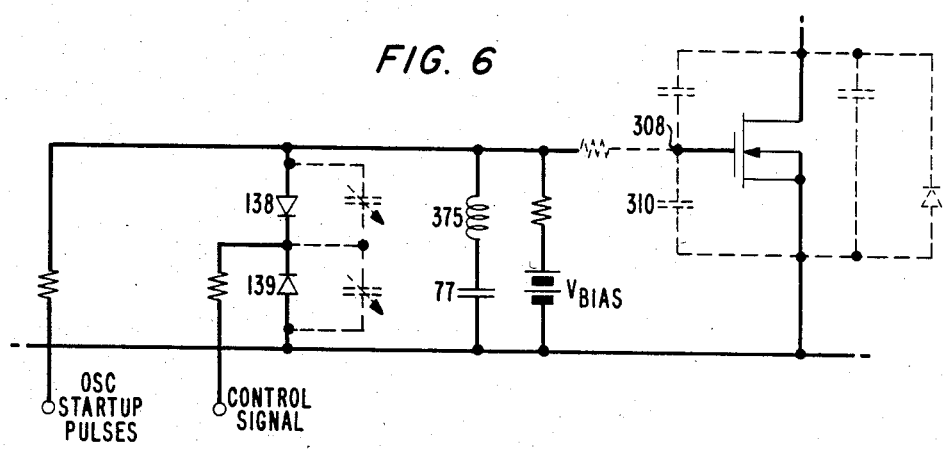
Figure 7:
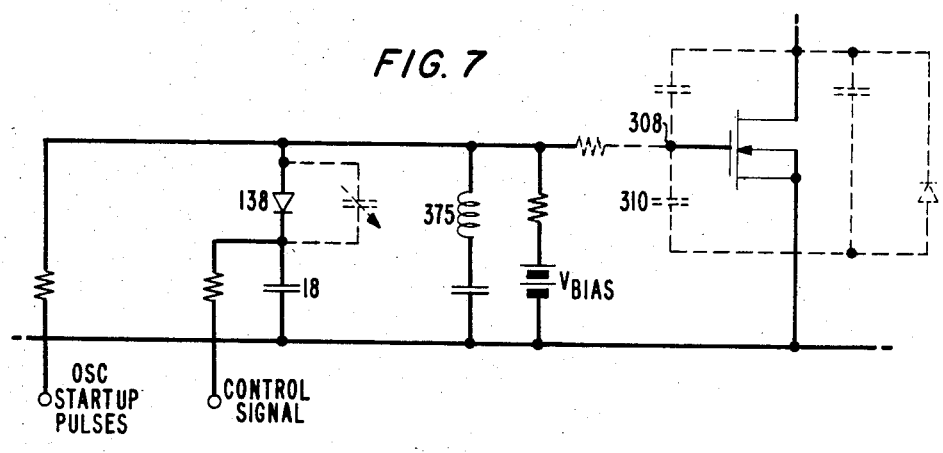

In the inverter circuit embodiment shown in FIG. 6, the control signal is applied to a junction of the series connected diodes 138 and 139. The diodes are connected in shunt with a series connection of inductor 375 and fixed DC blocking capacitor 77. As above, the control signal varies the diode capacitance to alter the overall inductive reactance of the network as presented to gate terminal 308. The inverter embodiment of FIG. 7 applies the control signal to a junction of series connected diode 138 and a fixed capacitor 18. Many additional variations of both the inverter circuit and the power train will be readily apparent to those skilled in the art without departing from the spirit and scope of the invention.

The converter in FIG. 3 includes a fullwave resonant rectifier comprising Schottky diodes 331 and 332. Shown in dotted lines are two capacitors, 333 and 334, which represent the inherent or adjunct capacitances of diodes 331 and 332, respectively. The secondary lead and transformer leakage inductances shown as inductors 457 and 458 of the secondary winding 356 combined with discrete inductances 357 and 358 and capacitances 333 and 334 form tuned circuits which as described above with reference to FIG. 2 shape the voltage waveforms appearing across the diodes 331 and 332 to approximate a time reversed image of the waveform across the MOSFET power switch 311.

Figure 8:
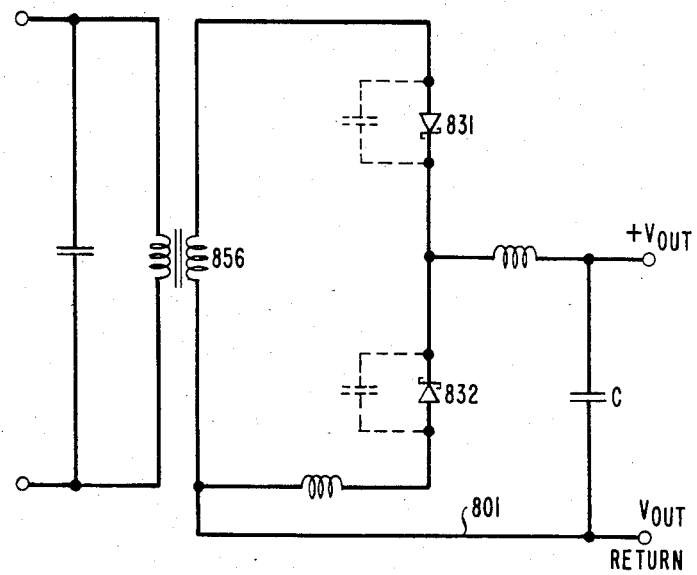
FIGS. 8 and 9 are schematics of alternate resonant rectifying arrangements embodying the principles of the invention.

An alternative embodiment of a resonant rectifier is shown in FIG. 8 in which the return lead 801 is connected to one terminal of the secondary winding 856 as opposed to being connected to a centertap of the secondary winding. The waveform across diodes 831 and 832 is shaped in the same manner as for the rectifiers shown in FIGS. 2 and 3.

Figure 9:
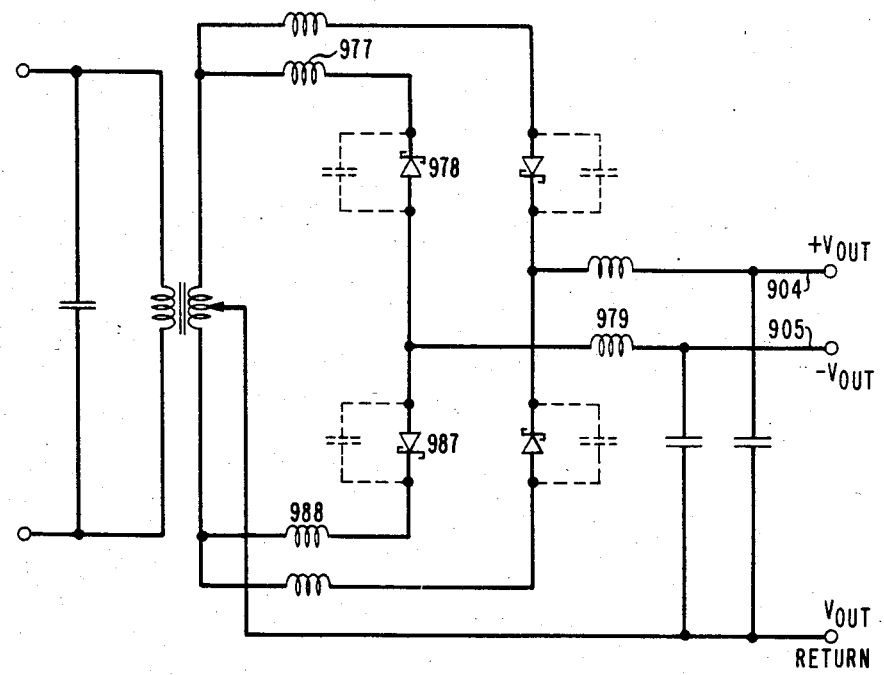

A rectifier arrangement for multiple outputs is shown in FIG. 9 in which a positive output voltage appears at lead 904 and a negative output voltage appears at lead 905. The positive output section is identical in principle to the rectifier appearing in FIG. 3. The negative output section utilizes added inductors 977 and 988, diodes 978 and 987 and output filter inductor 979. This arrangement also utilizes both discrete and adjunct reactances to shape the voltage waveform across the diodes 978 and 987 in the same way as described with reference to FIG. 3.

What is claimed is:
1. A self-oscillating power converter comprising:
   input means for accepting a DC voltage source,
   a semiconductor power switch including first and second main conduction path electrodes and a control electrode and further including at least an interelectrode capacitance between the first main conduction path electrode and the control electrode and having its first main conduction path electrode coupled to the input means,
   a feedback network for sustaining oscillations in the power converter including:
   the interelectrode capacitance coupling the first main conduction path electrode and the control electrode, and
   a variable inductive circuit coupling the control electrode to the second main conduction path electrode,
   the interelectrode capacitance and the variable inductive circuit having reactive values such that a sinusoidal voltage is generated at the control electrode causing oscillations to occur whereby the interelectrode capacitance is sufficient to be operative as an exclusive feedback path;
   a tuned network connected to the first main conduction path electrode and having an inductive reactive impedance and operative at a frequency of oscillation as established by the feedback network for controlling a voltage waveform at the first main conduction path electrode to be continuing for a portion of a cycle of operation while the semiconductor power switch is nonconducting and to be discontinued while the semiconductor power switch is conducting.

2. A self-oscillating power converter as defined in claim 1 and further including:
   voltage regulation means comprising:
   means for sensing an output voltage at the power converter,
   a reference voltage source,
   an error amplifier for comparing a voltage of the means for sensing and a voltage of the reference voltage source and generating an error voltage, and
   means for applying the error voltage to the variable inductive circuit in order to control a reactance thereof.

3. A self-oscillating power converter as defined in claims 1 or 2 wherein the variable inductance circuit comprises:
   a fixed inductor, and
   first and second diodes having capacitive characteristics and being connected to each other at a common node oriented thereat with opposing polarity and further connected in series with the fixed inductor.

4. A self-oscillating power converter as defined in claims 1 or 2 wherein the variable inductance circuit comprises:
   a series connection including a fixed inductor and a capacitor,
   first and second diodes having capacitive characteristics and being connected to each other at a common node oriented thereat with opposing polarity and further connected in parallel with the series connection of fixed inductor and the capacitor.

5. A self-oscillating power converter as defined in claims 1 or 2 wherein the variable inductance circuit comprises:
   a fixed inductor, and
   a fixed capacitor and a diode having capacitive characteristics and the fixed capacitor and diode connected to each other at a common node and further connected in series with the fixed inductor.

6. A self-oscillating power converter as defined in claims 1 or 2 wherein the variable inductance circuit comprises:
a series connection of a fixed inductor and a capacitor,
a fixed capacitor and a diode having capacitive characteristics and the fixed capacitor and diode being connected to each other at a common node and further connected in parallel with the series connection of fixed inductor and the capacitor.

7. A self-oscillating power converter as defined in claims 1 or 2 or 6 further including an output rectifier coupled to the tuned network and comprising:
a rectifying diode, and
an LC network tuned so as to form part of the tuned impedance of the tuned network.

8. A power converter as defined in claims 1 or 2 wherein the semiconductor power switch includes second interelectrode capacitance between the second main conduction path electrode and the control electrode and the frequency of oscillation established by the feedback network is less than the resonant frequency of the network comprising the variable inductance and the second interelectrode capacitance.

9. A power converter as defined in claims 1 or 2 wherein the feedback network is operative for converting a periodic pulsed unipolar voltage waveform at the first main conduction path electrode to a continuous full cycle substantially sinewave voltage waveform at the control electrode.

10. A power converter comprising:
input means for accepting a DC power source,
output means for accepting a load to be energized,
a transistor switch coupled for receiving power from the input means and having a control electrode, first and second power carrying electrodes and having interelectrode capacitance between the first and second power carrying electrodes and between each power carrying electrode and the control electrode,
a tuned network coupling the first power carrying electrode to the output means and operative for controlling a voltage waveform at the first electrode lasting for portion of a half-cycle of operation of the transistor switch during its nonconducting state,
a feedback network including an interelectrode capacitance coupling the first power carrying electrode and the control electrode and a frequency control network including an inductance and a variable capacitance coupling the control electrode to the second power carrying electrode, the interelectrode capacitance and the inductance and variable capacitance being tuned to generate a quasi-sinewave voltage at the gate electrode with a leading phase of 120° to 180° with respect to a fundamental component of the pulsed voltage waveform at the first power carrying electrode, and
the feedback network being operative to generate the quasi sinewave voltage at the gate electrode at a frequency when the interelectrode capacitance is operative as an exclusive feedback path.

11. A power converter as defined in claim 10 wherein:
a frequency of operation of the converter established by the feedback network is less than the resonant frequency of the frequency control network comprising connected inductance and variable capacitance and an interelectrode capacitance between the second power carrying electrode and the control electrode.

12. A power converter as defined in claim 10 and further including:
voltage regulation means comprising:
means for sensing a voltage at the output means,
means for comparing a voltage at the means for sensing with a reference voltage and generating an error voltage, and
means for utilizing the error voltage for controlling the variable capacitance.

13. A power converter as defined in claims 10 or 11 or 12 wherein the variable capacitance comprises two diodes connected in series and having their cathode terminals joined to a common node.

14. A power converter as defined in claims 10 or 11 or 12 and further including:
an output rectifier coupled between the tuned network and the output means and comprising:
rectifying diodes, and
an LC network tuned so as to form with the tuned network and the output means a composite tuned network operative for shaping a voltage waveform at the first power carrying electrode.

15. A power converter comprising:
input means for accepting a DC power source,
output means,
a MOSFET power switch coupled for receiving power from the input means and including interelectrode capacitances,
a frequency tuned network coupling an output electrode of the MOSFET power switch to the output means, and operative for maintaining current through the power switch exclusive of voltage across the power switch,
an oscillatory feedback network including:
an interelectrode capacitance coupling the output electrode to a control electrode of the MOSFET power switch and a frequency control circuit including an inductor and variable capacitance coupling the control electrode to a third electrode of the MOSFET power switch, and operative for supplying a continuous sinusoidal drive signal at the control electrode at a sufficiently high frequency so that the interelectrode capacitance coupling the output electrode to the control electrode is an exclusive feedback path.

16. A power converter as defined in claim 15 and further including:
voltage regulation means comprising:
means for sensing a voltage at the output means,
means for comparing a reference voltage with a sensed voltage of the means for sensing and generate an error signal therefrom, and
means for coupling the error signal to the variable capacitance for controlling a capacitance value thereof.

17. A power converter as defined in claims 15 or 16 wherein:
the variable capacitance comprises two diodes connected in series and having their main conduction paths oriented in opposite directions.

18. A power converter as defined in claims 15 or 16 wherein:

the frequency tuned network is inductively reactive at an operating frequency of the converter and includes components which limit a voltage waveform at the output electrode of the power switch to a part of a cycle of operation, and the interelectrode capacitance and the frequency control circuit of an inductor and variable capacitor being at values to cause a continuous quasi sinewave to occur at a control electrode of the power switch at a frequency below a resonant frequency of a circuit connection of the inductor and variable capacitor and an interelectrode capacitance between the control electrode and the third electrode of the power switch.

19. A self-oscillating power converter comprising:

input means for accepting a DC voltage source output means, a semiconductor power switch coupled for controlling energy flow from the input means to the output means and including first and second main conduction path electrodes and a control electrode for controlling current flow in a main conduction path of the power switch, a tuned network coupling the first main conduction path electrode to the output means and operative for controlling a voltage waveform at the first main conduction path electrode to be continuous for a portion of a half-cycle of operation of the semiconductor power switch during its nonconducting state, a tunable narrow bandwidth drive network for driving the power switch including;

capacitive means coupling the first main conduction path electrode to the control electrode, and inductive means having variable inductance in response to a control signal and coupling the second main conduction path electrode to the control electrode, control means for supplying a control signal varying the inductance of the inductive means, whereby the capacitive means and inductive means operate cooperatively to supply a quasi sinewave voltage at the control electrode and the control means is operative for varying a frequency of operation of the converter to control a signal amplitude at the output means.

20. A self-oscillating power converter as defined in claim 19 wherein the semiconductor power switch includes substantial interelectrode capacitance between the first main conduction path electrode and the control electrode and a capacitive value of the interelectrode capacitance being sufficient to comprise the capacitive means.

21. A self-oscillating power converter as defined in claim 20 wherein the control means includes;

voltage regulation means comprising:

means for sensing a voltage at the output means, means for comparing a voltage sensed by the means for sensing with a reference and generating an error voltage, and means for utilizing the error voltage as the control signal to vary inductance of the inductive means.

22. A self-oscillating power converter as defined in claim 21, wherein the inductive means includes a tunable network having an overall inductive reactance at a frequency of operation of the converter and including a fixed inductor and a variable capacitance connected together, whereby the variable capacitance responds to the control signal and the overall inductive reactance of the network is varied.

23. A self-oscillating power converter as defined in claim 22 further including an output rectifier having diodes and having tuned circuit elements so that a voltage waveform across the diodes is substantially a time reversal of the voltage waveform across the semiconductor power switch.

* * * * *